(12) United States Patent
Gillino

(10) Patent No.: US 6,342,947 B1
(45) Date of Patent: Jan. 29, 2002

(54) OPTICAL POWER HIGH ACCURACY STANDARD ENHANCEMENT (OPHASE) SYSTEM

(75) Inventor: Gary D. Gillino, Huntsville, AL (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/545,840

(22) Filed: Apr. 10, 2000

(51) Int. Cl.[7] .............................. G01J 1/42; G01J 1/10
(52) U.S. Cl. .................. 356/218; 356/243.1; 250/252.1
(58) Field of Search ............................... 356/213, 218, 356/222, 228, 229, 230, 232, 243.1, 243.8, 73.1; 250/252.1; 378/207; 324/600, 601; 385/16, 17, 18

(56) References Cited

U.S. PATENT DOCUMENTS

| | | | | | |
|---|---|---|---|---|---|
| 4,223,995 A | * | 9/1980 | Fletcher | ...................... | 356/418 |
| 4,737,029 A | * | 4/1988 | Yabusaki et al. | ........... | 356/225 |
| 5,072,111 A | * | 12/1991 | Gilino | .................... | 250/227.15 |
| 5,148,233 A | * | 9/1992 | Imamura et al. | ......... | 250/252.1 |
| 5,229,838 A | * | 7/1993 | Ganz et al. | ................. | 356/328 |
| 5,548,399 A | * | 8/1996 | Takai et al. | .................. | 356/218 |
| 5,666,059 A | * | 9/1997 | Heuermann et al. | ....... | 324/601 |

FOREIGN PATENT DOCUMENTS

JP 9-264811 * 10/1997

* cited by examiner

Primary Examiner—Hoa Q. Pham
(74) Attorney, Agent, or Firm—Freddie M. Bush; Hay Kyung Chang

(57) ABSTRACT

By employing a high-repeatability optical switch that transmits input optical power selectively either to the standard or the unit under test (UUT), OPHASE presents a system for performing a rapid, repeatable comparison between the standard and the UUT. Further, the selective routing of beam traveling through one of the two output fibers that are coupled to the switch either to the standard or the UUT enables the elimination of much of the system uncertainty by enabling initial characterization of the ratio, $R_p$, and inequivalence, $I_m$, between the power outputs of the multiple output fibers coupled to the switch. This characterization is accomplished by using an angled interface which is constructed so as to allow simultaneous coupling of the multiple output fibers to the angled interface and enable the power readout of all the output fibers at the standard. $R_p$ and $I_m$ are then used to calculate the correction factor that reduces the total uncertainty level in the subsequent calibration of the unit under test.

15 Claims, 4 Drawing Sheets

OPTICAL POWER HIGH ACCURACY STANDARD ENHANCEMENT (OPHASE) SYSTEM

DEDICATORY CLAUSE

The invention described herein may be manufactured, used and licensed by or for the Government for governmental purposes without the payment to me of any royalties thereon.

BACKGROUND OF THE INVENTION

With the recent rapid advances in technologies such as lasers, electro-optics, fiber optics and other similar photometric sciences, there has grown a requirement for high-accuracy, fast yet simple and inexpensive optical power measurement and calibration techniques.

A currently available optical power measurement device known as Electrically Calibrated Pyroelectric Radiometer (ECPR) is practical and highly accurate. It has a + or –1% uncertainty rate and, unlike most other optical power measurement devices, is wavelength-independent over a broad spectral range. Further, it is designed to respond to power change. Therefore, incoming continuous wave optical power, to be incident on the ECPR, must be chopped or AC-modulated when making optical power measurements. The National Institute of Standards and Technology (NIST) uses the ECPR as its optical power transfer calibration standard.

The substitution method is employed by many calibration techniques. It consists of comparing the unit under test (UUT) with the chosen standard. The UUT is said to be transfer-calibrated by the standard. Naturally, each transfer-calibration that is made further down the measurement process from the standard adds uncertainty. Therefore, it is desirable to reduce the number of intermediate steps in the measurement chain. One way to achieve such a reduction is to use a higher-level standard, rather than some other intermediate standard, at the location where the UUT is to be calibrated.

Many laboratories which need to calibrate their UUT's already have fiber-coupled optical power sources at the several wavelengths required to perform optical power transfer-calibration by the substitution method. At present, these laboratories typically use an intermediate standard to transfer-calibrate the UUT. What is needed is a low-cost and easy-to-use means to utilize ECPR or other higher-level standard in conjunction with fiber-coupled optical power sources, optical attenuation and other equipment already existing in these laboratories to perform the necessary calibration.

SUMMARY OF THE INVENTION

By employing a high-repeatability optical switch 11 that can transmit input optical power selectively either to the standard or the unit under test (UUT), OPHASE presents a means for performing a rapid, repeatable comparison between the standard and the UUT, thereby eliminating the requirement for expensive optical power monitoring/compensation systems or reference detectors to obtain optical power stability. Further, the selective outing of beam traveling through one of the output fibers that are coupled to the witch either to the standard or the UUT eliminates much of the system uncertainty by enabling initial (i.e. prior to testing any UUT) characterization of the inequivalence, $I_m$, and the ratio, $R_p$, between the power outputs of the multiple output fibers coupled to the switch. This characterization is accomplished by using angled interface 45 which allows simultaneous coupling of the multiple output fibers to the angled interface so as to enable the power readout of all the output fibers at the standard. $R_p$ and $I_m$ are then used to calculate the correction factor that reduces the total uncertainty level in the subsequent measurement of the UUT.

DESCRIPTION OF THE PREFERRED EMBODIMENT

Figure 1:
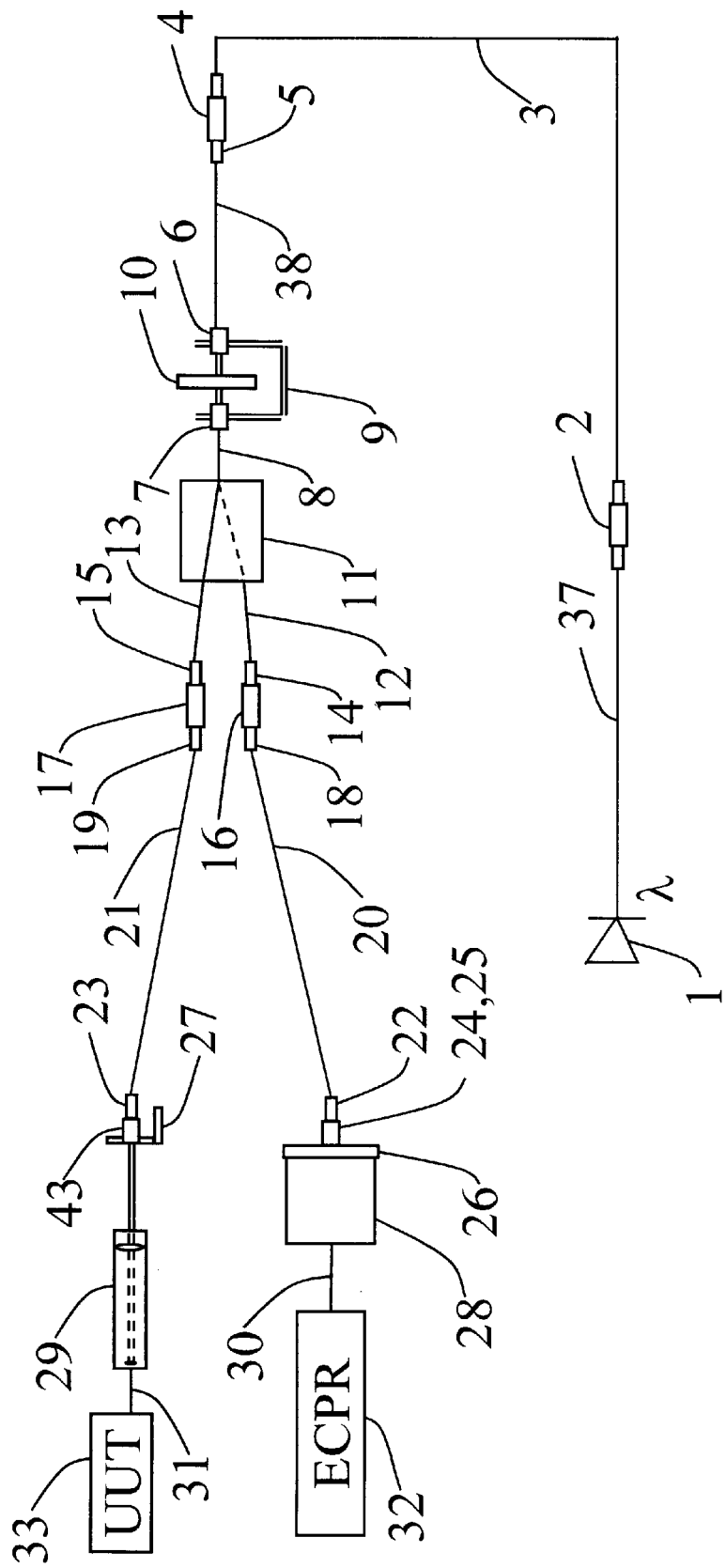
FIG. 1 illustrates the use of OPHASE in a collimated beam calibration configuration.

One area of notable concern in any effort to measure and calibrate, no matter what is the parameter being measured (example: voltage, current, optical power) is the instability, over time, of output of the source supplying the parameter in question. Because of the instability which may be caused by long-term drift and short-term fluctuation, the degree of measurement certainty is adversely affected when a conventional substitution method is used. All optical power sources have some level of drift and fluctuation that need to be taken into consideration if overall measurement uncertainty is to be reduced.

The OPHASE system offers a cost-effective means to overcome a large portion of the time-dependent optical source instability by making comparison measurements between the standard and UUT with a very short time interval (seconds) between the measurements. This is achieved by using high-repeatability optical switch 11 that selectively routes optical power to the standard and the UUT via a first optical path and a second optical path, respectively, where additionally the second optical path is movable so as to extend selectively between the switch and the calibration standard or between the switch and the UUT. After performing initial characterization of the output power levels from the two paths at the standard and the calculation of the optical power ratio, $R_p$, and corresponding power correction factor, the second path can be quickly moved to extend between the switch and the UUT, thus effectively eliminating any real concern about the power source instability. Further, because comparison measurements are performed quickly and easily, additional sets of measurements can be made rapidly to collect further data. This data can then be used to average out any system random uncertainty that may be due to fluctuation of the power source, non-repeatability of the switch and/or the ECPR standard.

Referring now to the drawing wherein like numbers represent like parts in each of the several figures, the structure and operation of the OPHASE system are presented in detail.

FIG. 1 shows the use of OPHASE in a collimated beam calibration configuration. In it, continuous wave (CW) optical beam of a given wavelength λ and power emanates from source 1 and travels, via third output fiber 37, to third optical fiber 3, the third output fiber and the third optical fiber being coupled to each other by third bulkhead connector 2. This input beam continues to travel through third optical fiber 3 to reach fourth bulkhead connector 4 where it is transmitted by seventh optical fiber connector 5 and fourth output fiber 38 to first collimating lens 6. The first collimating lens converts the CW fiber signal to a collimated free space CW signal and transmits the signal to focusing lens 7 which brings the free space collimated beam into the core of fifth output fiber 8. The optical axes of first collimating lens 6 and focusing lens 7 are maintained in alignment by air gap assembly 9. Within the air gap assembly is chopper 10, positioned between the focusing lens and the first collimating lens, that upon selected activation converts the CW signal to a modulated (changing) signal at the frequency, duty cycle and waveform required by ECPR 32, standard detector 28 and first electrical cable 30. The optical beam, whether modulated or not as required by the chosen calibration standard, enters switch 11 via fifth output fiber 8 and is routed therefrom selectively either to first output fiber 12 or second output fiber 13. As illustrated in FIG. 1, the first and second output fibers comprise, respectively, the first optical path and the second optical path.

Figure 3:
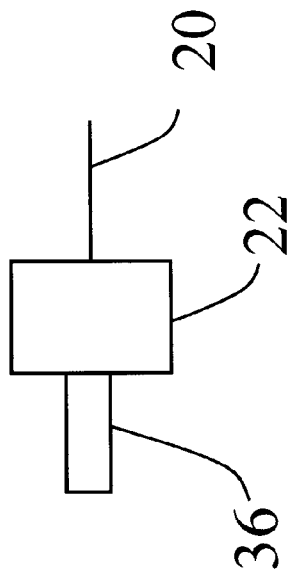
FIG. 3 is a detailed side view of the fifth and the sixth optical fiber connectors, each having a collimating lens 36.
Figure 5:
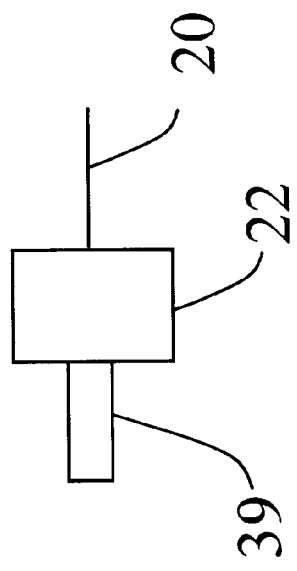
FIG. 5 is a detailed side view of the fifth and the sixth optical fiber connectors, each having a typical connector ferrule 39.
Figure 2:
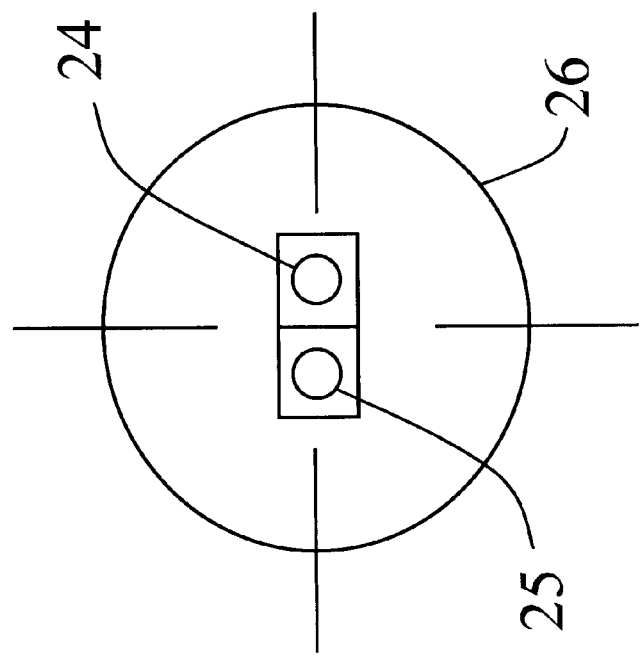
FIG. 2 is a detailed frontal view of standard head alignment cap.
Figure 4:
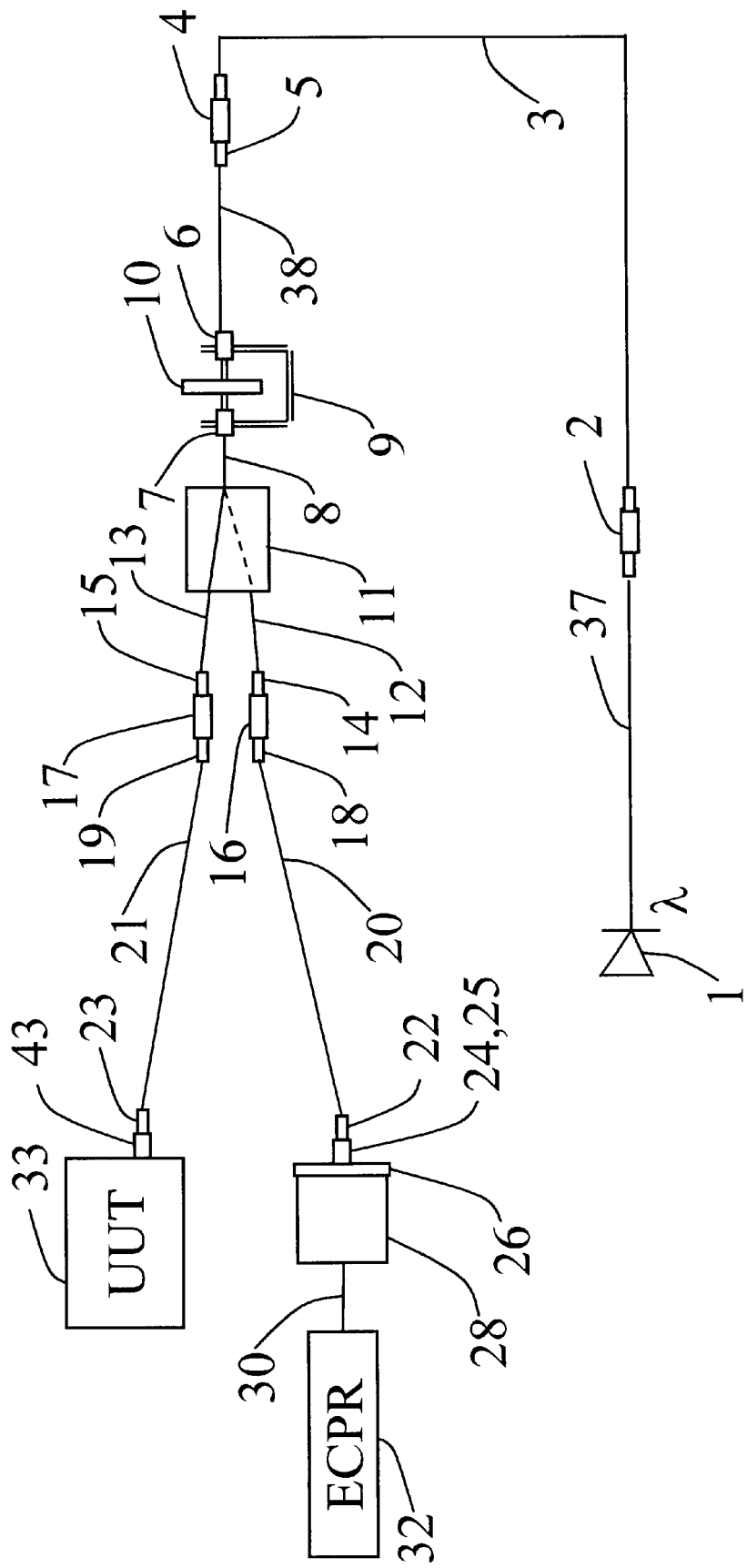
FIG. 4 illustrates the use of OPHASE in a connectorized fiber calibration configuration.

The first optical path further comprises first and second optical fiber connectors 14 and 18, and first bulkhead connector 16 coupled between the first and second optical fiber connectors. From second optical fiber connector 18, first optical fiber 20 extends to be terminated with fifth optical fiber connector 22 which has, mounted to one end thereof, second collimating lens 36 as shown in FIG. 3. In a like manner, the second optical path further comprises third and fourth optical fiber connectors 15 and 19, and second bulkhead connector 17 coupled between the third and fourth optical fiber connectors. From fourth optical fiber connector 19, second optical fiber 21 extends to be terminated with sixth optical fiber connector 23 which also has, mounted to one end thereof, a third collimating lens identical to second collimating lens 36 shown in FIG. 3. In the connectorized fiber calibration configuration depicted in FIG. 4, the first and second optical paths are constituted in exactly the same way as in the collimated beam calibration configuration of FIG. 1 except that fifth and sixth optical fiber connectors 22 and 23 each has mounted thereto a standard connector ferrule 39 as detailed in FIG. 5 instead of the second and third collimating lenses.

In order to perform precise calibration of the UUT, initial compensation factors must be determined for any differences between the power outputs of the two optical paths ($R_p$) and maximum inequivalence ($I_m$) between the two inputs to ECPR detector 28 via the two optical paths prior to taking measurements of any UUT 33 for calibration. The difference between the power outputs of the two optical paths may be caused by the nature of optical power source 1 and/or switch 11 putting unequal power into first and second output fibers 12 and 13 as a function of wavelength λ whereas any inequivalence between the two inputs to ECPR detector 28 may be the result of geometrical considerations or non-uniformity of ECPR detector 28 itself.

Figure 6:
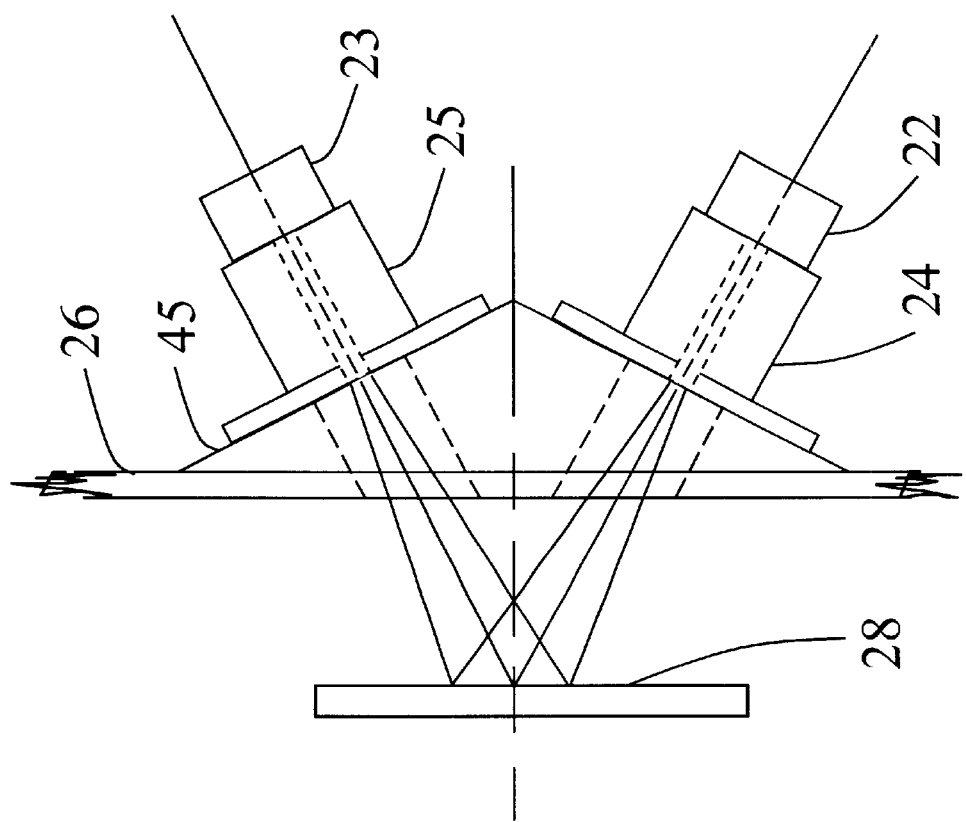
FIG. 6 is a top view of the standard head alignment cap with the angled interface.

FIG. 6 illustrates how $R_p$ and power correction factor are determined in OPHASE. Fifth and sixth optical fiber connectors 22 and 23 are both connected simultaneously to ECPR detector 28 via head alignment cap (HAC) 26 which has incorporated onto it angled interface 45. The two surfaces of the angled interface have mounted thereto first and second half-bulkhead connectors 24 and 25 and to these first and second half-bulkhead connectors fifth and sixth optical fiber connectors 22 and 23 are removably coupled. In this way, the power output of the first and second optical paths are directed to the same area on ECPR detector 28. After the connection of fifth and sixth optical fiber connectors 22 and 23 to first and second half-bulkhead connectors 24 and 25, respectively, the optical power levels of the two optical paths are measured with the ECPR by using switch 11 to select the routing of the optical signal through either first or second output fibers 12 or 13. The resulting optical power levels $P_{low}$ and $P_{high}$ will be different by some amount according to the specific optical switch employed in the system, wavelength X and any intermediate attenuation differences between switch 11 and fifth and sixth optical fiber connectors 22 and 23. These resulting power levels are used to calculate the power ratio $R_p$ for the configurations in FIG. 1 and FIG. 4:

$$R_p \text{ (collimated beam)} = P_{high}/P_{low} \qquad (eq. 1)$$

$$R_p \text{ (connectorized fiber)} = P_{high}/P_{low} \qquad (eq. 2)$$

Head alignment cap 26 is constructed so that the spots resulting on ECPR detector 28 from two beams incident thereon through the two optical paths are essentially of equal size. However, to minimize the inequivalence between them, any inequivalence that may be present can be accurately measured by first attaching fifth and sixth optical fiber connectors 22 and 23 to the first and second half-bulkhead connectors, respectively, and measuring the outputs; then disconnecting the fifth and sixth optical fiber connectors and reconnecting them to the first and second half-bulkhead connectors, but in reverse order this time, and again measuring the outputs. The second and third collimating lenses, mounted at the end of the fifth and sixth optical fiber connectors, respectively, as shown in FIG. 3, are designed to allow easy attachment and detachment of the same to and from half-bulkhead connectors. It is noted also that, instead of disconnecting and reconnecting the fifth and sixth optical fiber connectors, they can be left in place and the head alignment cap itself rotated by 180° from its initial position. This method is simpler and may actually result in a more accurate measurement of inequivalence. Maximum inequivalence is calculated as follows:

$$I_m = [R_p - R_p (180°)]/[R_p + R_p (180°)]/2 \qquad (eq. 3)$$

where $R_p$ (180°) is the power ratio with the fifth and sixth optical fiber connectors reversed at the first and second half-bulkhead connectors. The closer $I_m$ is to "0", the smaller is the inequivalence between the inputs onto ECPR detector 28.

Following the above calculations of $R_p$ and $I_m$, UUT 33 can be calibrated by comparing its measurement results against the ECPR. To do this, whichever optical fiber connector, either 22 or 23, that has $P_{low}$ is disconnected from HAC 26 and projected to UUT detector 29 via connection to third half-bulkhead connector 43, held in place by supporting fixture 27, while the other optical fiber connector remains connected to the HAC. Thereafter switch 11 is selected to route incoming optical signal to the ECPR detector 28 where the power output $P_{ECPR}$ is measured when the optical signal is converted to an electrical signal and is transmitted, via first electrical cable 30, to ECPR read-out in ECPR 32 which then displays the electrical signal as a numerical value indicating the absolute optical power radiating on the ECPR detector 28. Next, the switch is selected to route the optical signal to the UUT where the power output $P_{UUT}$ is measured when the optical signal is converted to an electrical signal and is transmitted, via second electrical cable 31, to UUT read-out in UUT 33 which, in turn, displays the electrical signal as a numerical value indicating the absolute optical power radiating on the UUT detector 29.

Subsequent to the readings of initial power outputs of the ECPR and the UUT, the previously calculated $R_p$ is used to correct for the difference in $P_{ECPR}$ and $P_{UUT}$:

$$P_{UUT} \text{ (corrected)} = R_p \times P_{UUT} \qquad \text{(eq. 4)}$$

The values for $P_{ECPR}$ and $P_{UUT}$ (corrected) can then be directly compared to determine the initial absolute power correction at a given power level between the ECPR and the UUT:

$$\text{Initial Power Correction} = P_{ECPR} - P_{UUT} \text{ (corrected)} \qquad \text{(eq. 5)}$$

If $I_m$ is non-negligible, i.e. it has a significant effect on the overall uncertainty level of the calibration process, this impact can be minimized by factoring one minus half of the maximum inequivalence value in the initial power correction to yield the final power correction:

Final Power Correction $$(P_{ECPR} - P_{UUT} \text{ (corrected)}) \times (1 - |(I_m/2)|) \qquad \text{(eq. 6)}$$

Use of eq.6 reduces the uncertainty in the calibration process that is due to inequivalence by a factor of two having the same error reduction effect as taking the median of a number of measurements.

Adding the initial power correction value to any measured $P_{UUT}$ results in the UUT reading the same as the ECPR at the power level and wavelength of the input CW optical beam, thereby yielding a unit under test that has been calibrated against the standard.

OPHASE can also be used to provide an effective means for calibrating irradiance, obviating the traditional requirements that the input beam of known irradiance be uniform and large enough in diameter to overfill the apertures of the standard and the unit under test. The collimated beam, in the collimated beam calibration configuration of FIG. 1, is typically gaussian in beam profile. Its optical power in watts is measured with the ECPR standard, $P_{ECPR}$. The effective aperture radius of the UUT, $R_{eff}$, is measured with conventional means that allows calculation of the effective area of the UUT aperture, $A_{eff}$. The derived irradiance is given by:

$$\text{Ir} = P_{ECPR}/A_{eff} \qquad \text{(eq. 7)}$$

which has the required units of W/cm². Knowing the irradiance to the UUT from this method permits calibration without having to overfill the aperture or be concerned about the beam uniformity. One way to imagine how this works is to think of the incoming collimated beam as being virtually expanded. This virtual, expanded beam will have exactly the same optical power as the real beam and exactly the same area as the UUT aperture effective area. It will have perfect irradiance uniformity because the optical power is evenly distributed over the effective area.

In summary, OPHASE system provides a fast, reliable and a very accurate means for calibrating units under test against a pre-selected standard such as ECPR. The system is also inexpensive because it can be used with existing fiber-coupled optical sources that are commonly found in many laboratories that require such calibration. By bringing a highly accurate standard such as ECPR to be utilized directly in transfer-calibration of the units under test, OPHASE reduces the number of or eliminates intermediate standards, thereby increasing the level of accuracy in the calibration process. Once initial measurements for $R_p$ and $I_m$ are completed and connection is made to the UUT, OPHASE allows a "hands-off" calibration system that can easily be automated.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. An optical power high accuracy standard enhancement (OPHASE) system for comparing the optical power output of a unit under test (UUT) against the optical power output of a pre-selected calibration standard, the standard having a first detector head, that enable the calibration of the UUT to have identical reading as the calibration standard at a given power level and wavelength of input beam, said OPHASE system comprising: a source of input beam; a high-repeatability switch, said switch being capable of routing input beam selectively into first and second optical paths; a means for providing said optical paths, said first optical path extending between said switch and the calibration standard and said second optical path being movable to extend selectively between said switch and the calibration standard or between said switch and the UUT; and a means for coupling the input beam from said source to said switch.

2. OPHASE system as described in claim 1, wherein said means for providing said first optical path comprises a first bulkhead connector; a first output fiber coupled to said switch; a first optical fiber connector coupled between said first output fiber and said first bulkhead connector; a second optical fiber connector coupled to said first bulkhead connector; a head alignment cap mounted on the first detector head, said cap having thereon a first half-bulkhead connector and a second half-bulkhead connector; a fifth optical fiber connector having thereon a second collimating lens; a first optical fiber extending between said second optical fiber connector and said fifth optical fiber connector, said fifth optical fiber connector being coupled to said first half-bulkhead connector.

3. OPHASE system as described in claim 2, wherein said means for providing said second, movable, optical path comprises a second detector head for converting incident optical beam to a corresponding electrical signal, said second detector head being connectable to the UUT; a second bulkhead connector; a second output fiber coupled to said switch; a third optical fiber connector coupled between said second output fiber and said second bulkhead connector; a fourth optical fiber connector coupled to said second bulkhead connector; a third half-bulkhead connector; a fixture for supporting said third half-bulkhead connector; a sixth optical fiber connector; a second optical fiber extending between said fourth optical fiber connector and said sixth optical fiber connector, said sixth optical fiber connector having thereon a third collimating lens, said third collimating lens being positioned to propagate any incident beam toward said second detector head when said second optical path extends between said switch and the UUT.

4. OPHASE system as described in claim 3, wherein said head alignment cap comprises two angled surfaces, each supporting, respectively, said first and second half-bulkhead connectors.

5. OPHASE system as described in claim 4, wherein said second half-bulkhead connector is adapted for having coupled thereto said sixth optical fiber connector for initial calculation of the ratio between the power outputs of said first and second output fibers and inequivalence of measurements at the first detector, said ratio and inequivalence being subsequently usable to yield the final power correction value necessary to calibrate the UUT.

6. OPHASE system as described in claim 5, wherein said source emits continuous wave beam.

7. OPHASE system as described in claim 6, wherein said system further comprises a first collimating lens for collimating the continuous wave beam to be a collimated free space continuous wave beam.

8. OPHASE system as described in claim 7, wherein said system still further comprises a focusing lens positioned to receive said collimated free space continuous wave beam from said first collimating lens and focus said wave beam and subsequently couple said focused beam into said switch.

9. OPHASE system as described in claim 8, wherein said system additionally comprises a means for selectively modulating said input continuous wave beam at the frequency, duty cycle and waveform required by the calibration standard, said modulating means being positioned between said first collimating lens and focusing lens.

10. OPHASE system as described in claim 9, wherein said means for coupling the input beam from said source to said switch comprises a third bulkhead connector; a third output fiber coupled between said source and said third bulkhead connector; a fourth bulkhead connector; a third optical fiber coupled between said third and fourth bulkhead connectors; a seventh optical fiber connector mounted onto said fourth bulkhead connector; and a fourth output fiber coupled to route said input beam from said seventh optical fiber connector to said first collimating lens.

11. OPHASE system as described in claim 10, wherein said modulating means is a mechanical chopper.

12. OPHASE system as described in claim 11, wherein said head alignment cap is rotatable in place by 180 degrees.

13. OPHASE system as described in claim 12, wherein said second and third collimating lenses are designed so as to allow facile attachment and detachment thereof to and from half-bulkhead connectors.

14. A method for calibrating a unit under test against a pre-selected calibration standard, said method comprising the steps of:

a) providing two selectable power outputs from a single power source;

b) connecting simultaneously the two selectable power outputs to be input to the calibration standard;

c) calculating the ratio between the two power outputs as read out at the calibration standard;

d) removing one power output from the calibration standard while maintaining the other power output at the calibration standard;

e) coupling the removed power output to the UUT;

f) obtaining the power readout at the UUT;

g) correcting the power readout of the UUT by multiplying the UUT power readout by the ratio of step c);

h) determining the initial power correction by subtracting the corrected UUT power readout from the power readout of the calibration standard;

i) adding the initial power correction to the UUT to calibrate the UUT.

15. A method for calibrating a unit under test against a pre-selected calibration standard, as set forth in claim 14, wherein said step f) further comprises: the step of obtaining multiple power readouts of the UUT and the calibration standard and the step of averaging the multiple power readouts to acquire a more accurate power readout of the UUT and the calibration standard.

* * * * *